June 16, 1936.  C. S. HORNBERGER  2,044,573
CONSTANT TEMPERATURE BATH
Filed Sept. 5, 1935  3 Sheets-Sheet 1
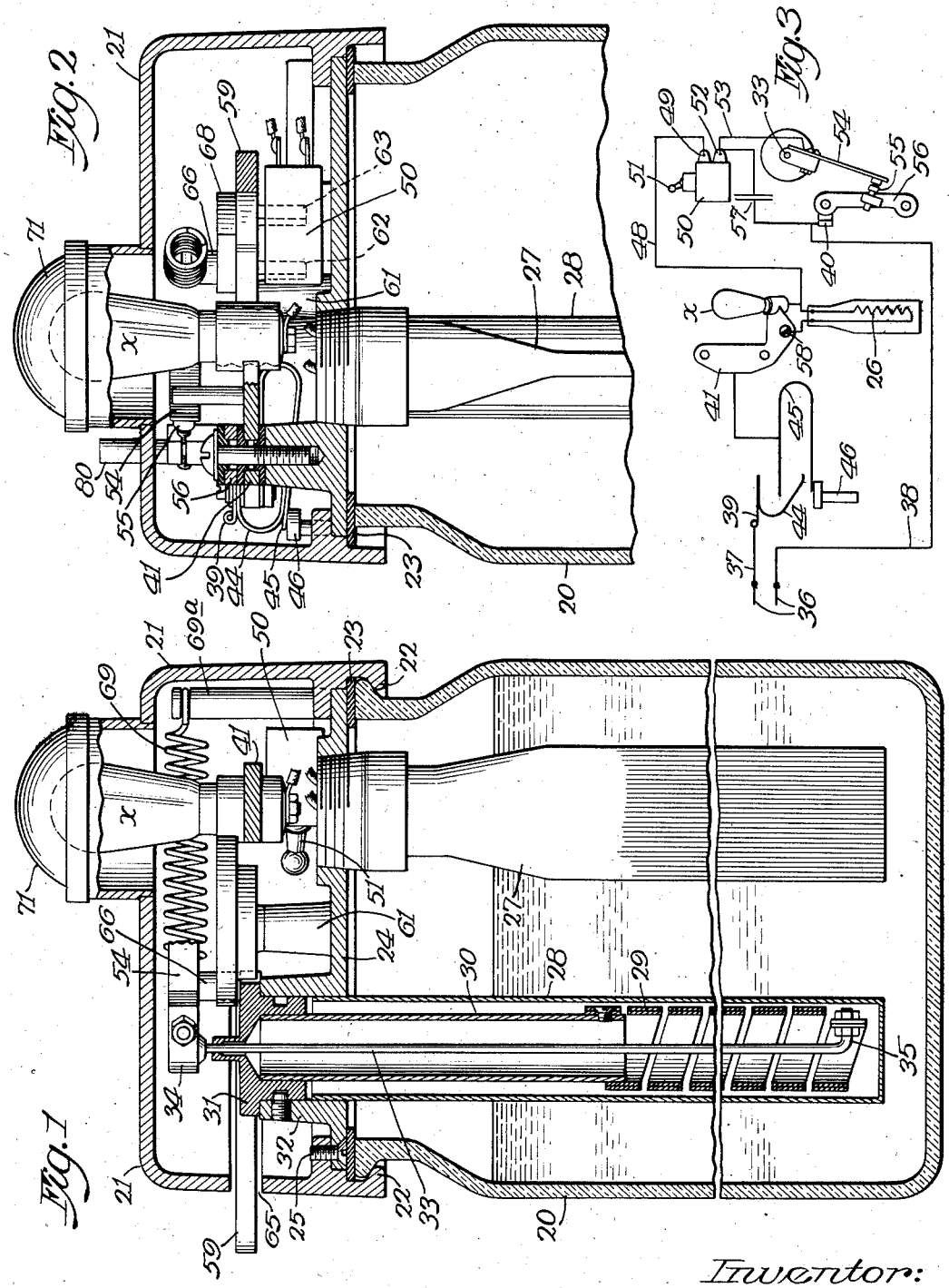
Inventor:
Carl S. Hornberger
By Gillson, Mann & Rot
Attys.

June 16, 1936.  C. S. HORNBERGER  2,044,573
CONSTANT TEMPERATURE BATH
Filed Sept. 5, 1935  3 Sheets-Sheet 2
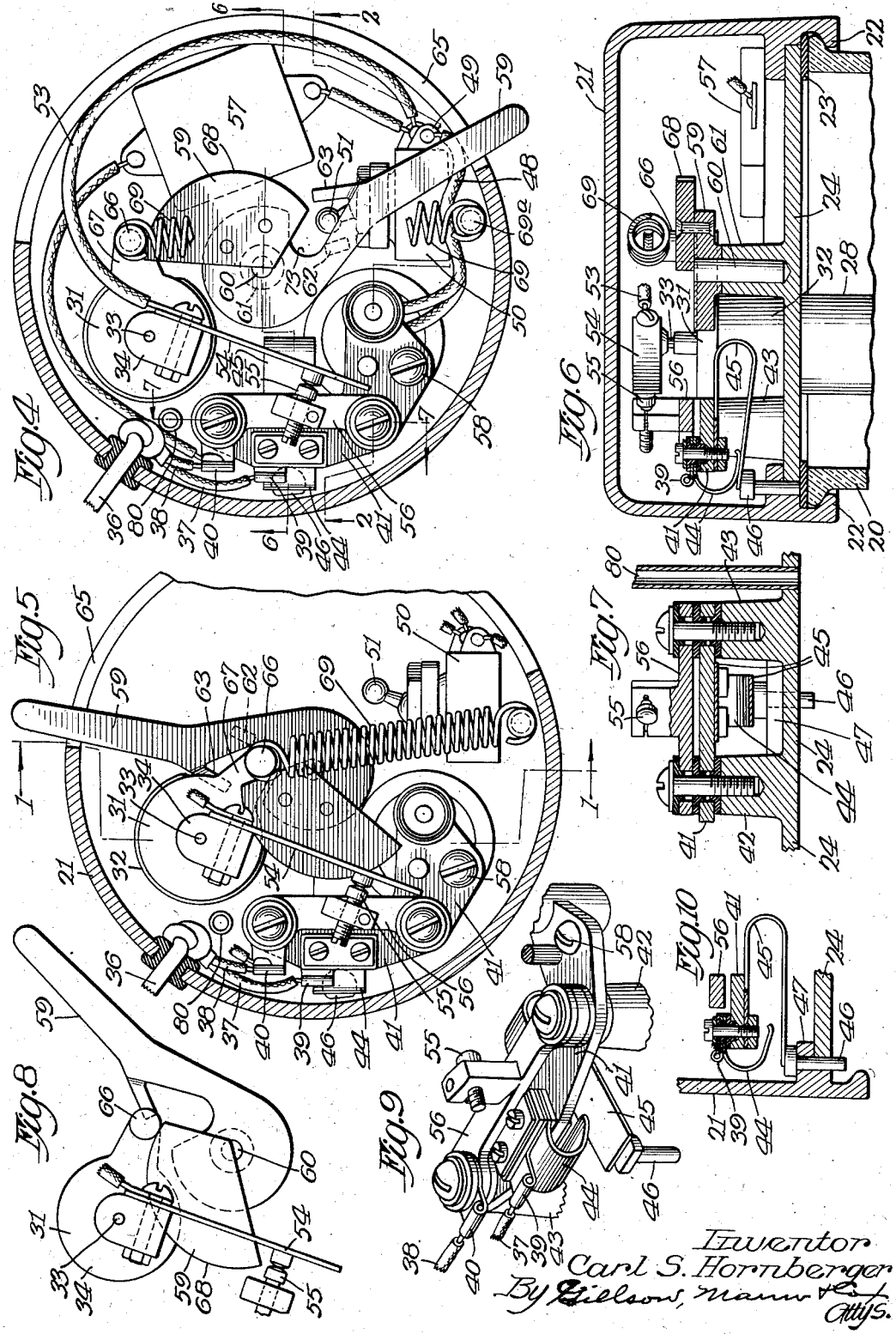
Inventor
Carl S. Hornberger
By Gibson, Mann &
Attys.

June 16, 1936.  C. S. HORNBERGER  2,044,573
CONSTANT TEMPERATURE BATH
Filed Sept. 5, 1935   3 Sheets-Sheet 3
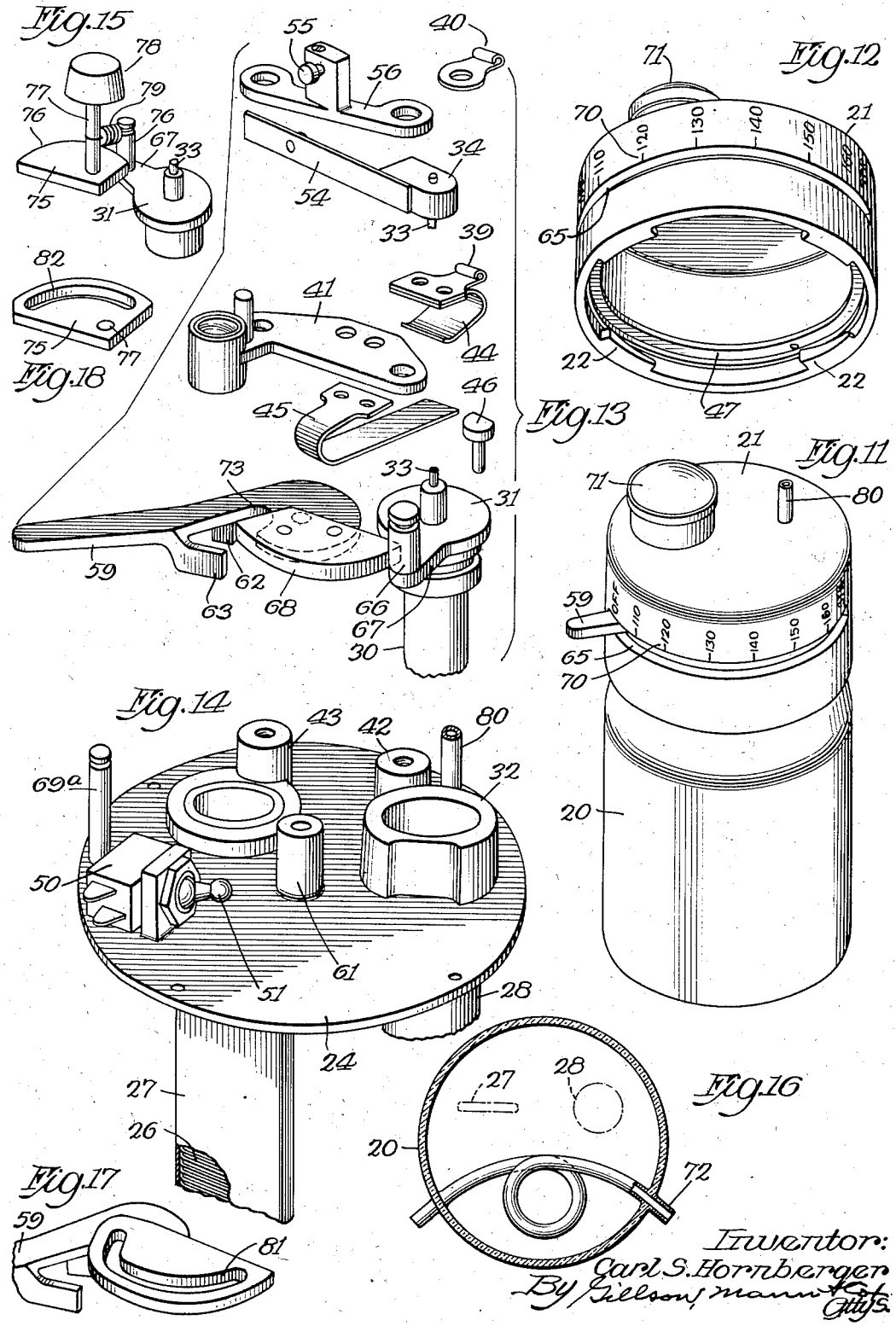
Inventor:
Carl S. Hornberger
By Gillson, Mann
Attys.

Patented June 16, 1936

2,044,573

UNITED STATES PATENT OFFICE 2,044,573

CONSTANT TEMPERATURE BATH

Carl S. Hornberger, Glen Ellyn, Ill., assignor to Central Scientific Company, a corporation of Illinois Application September 5, 1935, Serial No. 39,237

16 Claims. (Cl. 219—38)

The invention relates to heating devices for use in biological, chemical, and other laboratories, as for the digesting of chemicals, the development of cultures, controlling the temperature of substances being examined in refractometers, controlling the temperature of saline solutions being used for intravenous injections, and in many other situations where it is important to maintain constant temperatures.

The objects of the invention are to provide, in devices of this character, for maintaining constant temperatures of regulated values; for the reliable control, in such devices, of the electric heating means; and to generally improve devices of this class.

The character of the improvements is set out generally, and in detail, in the following description of the embodiment of the invention which is disclosed in the accompanying drawings, which are briefly described as follows:—

Fig. 1 is a detail vertical central section of the device taken on the line 1—1 of Fig. 5;

Fig. 2 is a detail section on the irregular line 2—2 of Fig. 4;

Fig. 3 is a diagrammatic representation of the electric circuit;

Fig. 4 is a plan section through the upper portion of the apparatus, showing the electric circuit control;

Fig. 5 is a view similar to Fig. 4, the parts being shown in different position and some parts being omitted;

Fig. 6 is a detail section on the line 6—6 of Fig. 4;

Fig. 7 is a sectional detail on the line 7—7 of Fig. 4;

Fig. 8 is a detail showing certain parts appearing in Figs. 4 and 5, in different positions;

Fig. 9 is a detail in perspective showing the line connections with the mechanism of the device;

Fig. 10 is a sectional detail of the automatic switch for opening the circuit when the cover is detached from the body of the device;

Fig. 11 is a perspective of the complete device;

Fig. 12 is a perspective of the cover portion of the device, viewed from below;

Fig. 13 includes views in perspective of a number of parts of the device;

Fig. 14 is a detail view in perspective of the bottom plate of the cover portion of the device, and of certain parts associated therewith;

Fig. 15 is a detail view in perspective of a modified form of means for adjusting the thermo regulator used in the device;

Fig. 16 is a plan section of the lower portion of the device, showing a modification; and Figs. 17 and 18 show modifications of a controlling cam for adjusting the regulator.

In the embodiment of the invention herein disclosed the device comprises three major features, viz:—

(1) a container which will be supplied with a heat-transmitting fluid and has a chambered cover;

(2) a heating element and a thermo regulating device carried by the cover, and depending into the body of the container; and (3) an electric circuit and controlling means therefor, and means for varying the action of the thermo regulating device.

The container

The container is shown as having the general form of a jar comprising a body portion 20, for holding a heat-transmitting fluid, such as water, and a cap or cover 21, these two parts being provided with interlocking lugs, as 22, for securing them together, a sealing gasket 23 being interposed. The chamber of the cover 21 is closed by a bottom plate 24, secured to the body portion of the cover by any suitable means, such as screws 25, setting through the plate and integral lugs on the cover. The container is preferably made of vitreous material, the glass known as Pyrex being suitable.

The heater and thermo regulator

An electric heating element 26, of ordinary character, enclosed within a non-porous casing 27, is secured to and depends from the bottom plate 24 of the cover. The material of which the casing 27 is made should be non-porous and a good conductor of heat. Preferably it is made of nickel-plated copper.

The thermo regulator is of the type shown in the patent to Klopsteg, No. 1,931,731, the heat sensitive element being inclosed within a non-porous casing 28, similar to that of the heating element, depending from and suitably attached to the cover plate 24. The heat sensitive element 29 is a bi-metallic helix, carried by a tube 30, fixed to and depending from a disk 31, rotatably mounted upon a tubular boss 32 projecting upwardly from the plate 24. A torque rod 33 is located on the axis of the tube 30, its upper end extending freely through the disk 31 and carrying a hub 34; its lower end being bent laterally to form a crank arm, as shown at 35, and being secured to the lower end of the helix 29.

Variations in temperature within the container will cause the turns of the helix to expand or contract, applying turning forces in opposite directions to the tube 30 and rod 33. These last-named parts are so associated with the elements of the local electric circuit that the current through the heating element 26 is interrupted or applied upon very slight variation from the temperature desired to be maintained within the container.

*The electric circuit and controlling means therefor*

The electric circuit housed within the cover 21 is connected with an outside service line 36 for supplying current, the two branches of such line being shown at 37, 38. The terminals of these branches are connected with the local circuit by means, respectively, of clips 39, 40.

The clip 39 is carried by but insulated from a conductive plate 41, mounted upon a pair of pedestals 42, 43, rising from the plate 24. A switch element, mounted and in electric contact with the clip 39, having the form of a curved plate 44, extends below the plate 41 and cooperates with a switch element 45, in the form of a bowed plate, one end of which is secured to and is in electric contact with the lower face of the plate 41,—its free arm resting upon a vertically movable pin 46, carried by a lug 47, formed on the inner face of the side wall of the cover 21, adjacent its lower margin.

While, for convenience of manufacture and assembly, the described means for automatically closing the circuit as the cover is applied to the body may be used, obviously it is immaterial whether the elements 45, 46, be separate or integrally connected parts, or whether the carrying lug 47 be present.

The switch elements 44, 45, are normally out of contact but are brought together upon the application of the cover 21 to the body 20 of the container, the pin 46 being pushed upwardly, as indicated in Fig. 6. This automatic switch insures the opening of the local circuit when the cover is removed from the body of the container, and thus protects the heating element from being burned out should the cover be removed with the manually controlled switch closed.

The local circuit is diagrammatically shown in Fig. 3, and may be traced as follows:—The clip 39, to which the branch 37 of the service line 36 is attached, is electrically connected with the plate 41 through the switch elements 44, 45, when the pin 46 is raised upon the application of the cover 21 to the body 20. From the plate 41 the local circuit leads by parallel branches through the heating element 26, and a pilot lamp x. From the juncture of these parallels a line 48 connects, at 49, with one terminal of a cut-out switch, which preferably is enclosed within a box, as shown at 50. From the other terminal, 52, of the last-named switch a line 53 leads to a switch element 54, mounted upon the upper end of the rod 33 of the thermo regulator, and cooperating with an adjustable stationary contact 55, mounted upon a plate 56 and carrying the clip 40, to which the branch 38 of the service line is attached. For the purpose of preventing arcing as the circuit is opened by the thermo regulator a condenser, conventionally represented at 57, is connected across the contacts controlled by the thermo regulator.

The plate 41 is extended laterally and carries a binding post 58, for the lead to the heating element 26, and also carries the socket for the bulb of the pilot light x. The plate 56 is mounted above the plate 41, and secured to the pillars 42, 43, by the same screws, these plates, however, being insulated from each other.

The local circuit is manually controlled by means of a lever 59, pivoted at 60 upon a pedestal 61, rising from the plate 24. This lever is provided with a pair of downwardly projecting lugs 62, 63, located, when the lever is in retracted position, upon opposite sides of the switch arm 51, projecting from the box 50. The switch lever 59 projects through a segmental slot 65 in the side wall of the cover 21. Upon the initial movement of the lever within this slot from the position of Fig. 4, the lug 62 makes contact with the switch arm 51, controlling the switch housed within the box 50. The switch within the box 50 is of a well known type in which the controlling arm, when moved in either direction, past the center, is carried still further forward by the action of a spring. This brings the switch arm 51 to the inclined positions shown in Figs. 4 and 5, and consequently out of the path of the lug 62 as the lever 59 is farther advanced and as it is retracted.

A contracting helical spring 69 connects a stud 66, carried by an arm 67 projecting radially from the disk 31, with a post 69ª, rising from the plate 24, urging the elements of the thermo regulator in a clockwise direction and the switch element 54 toward the element 55. The load-engaging end of the lever 59 impinges against the stud 66, resisting the action of the spring 69. The post-engaging end of the lever 59 is curved eccentrically to the lever fulcrum 60, as shown at 68, its radius of greatest length being in engagement with the stud 66 when the lever is completely retracted.

As the lever 59 is advanced the spring 69 contracts, turning the tube 30. The rod 33 being held against further turning movement by the switch terminal 55, it follows that winding force is applied to the helix. As this force increases a correspondingly higher temperature is required to overcome it, and permit the unwinding action of the helix necessary to withdraw the switch element 54 to open the circuit. It follows that the lever 59, by reason of the form of its load-carrying end, provides for the regulating of temperatures through a considerable range. This regulation may be very accurate, as there is no lost motion in the mechanism.

In Fig. 15 there is shown a modified form of controlling means. In this figure the terminals 31 and 33 of the regulating means are of the same form as in Figs. 1, 4, 5 and 13. A cam plate 75, having a face 76 of substantially the same form as the face 68 of Fig. 4, for engaging the stud 66 carried by the arm 67 projecting from the disk 31, is mounted on a rotatable spindle 77. A head 78, fixed on the spindle, provides means for turning the latter to wind up the helix against the resistance of a helical spring 79, reacting between the stud 66 and a stationary anchorage, as the spindle 77. The action is the same as in the construction of Figs. 4 and 5.

In both forms the disk 31 is turned in one direction by means of a cam, and in the other direction by a spring. Obviously a cam slot in the load end of the controlling lever 59, as shown at 81 in Fig. 17, or in the element 75 of Fig. 15, as shown at 82 in Fig. 18, conforming in curvature approximately to the faces 68 or 76, would provide for the turning of the disk 31 in both directions without the use of a spring.

As shown in Fig. 5 the curved face 68 of the load-engaging face of the lever 59 provides for a gradual increase in the temperature at which the regulator functions, until the switch lever nears the limit of its advance. At the inner end of the face 68 the lever is provided with a recess 73, into which the stud 66 enters as the lever approaches the limit of its advance movement, bringing the stud 66 quite close to the fulcrum and turning the tube 30 to tension the helix beyond the limit of the expansive action thereon of the maximum temperature the heating element is capable of developing. This final adjusting step adapts the device for use when high temperatures are required, as in sterilizing operations.

To permit the escape of steam when high temperatures are developed, a vent pipe 80 may be provided, leading through the cover 21, and provided, if desired, with a suitable safety valve which may be of common construction.

A temperature scale may be placed upon the cover 21 along the margin of the slot 65, as indicated at 70, its intervals being determined by the curvature of the contacting face 68, in order to insure accuracy of heat regulation; making it possible to instantly set the regulator to constantly maintain any desired temperature within.

The switch at 50 is closed on the initial advance of the lever 59. As this lever continues to advance the lug 62 passes beyond the switch arm 51, and consequently this switch remains closed until the arm 59 is again fully retracted, the lug 63, which is somewhat longer than the lug 62, making contact with the arm 51.

The pilot light x is covered by a lens 71, and gives indication that the local circuit is closed and the heater is functioning.

In the disclosed embodiment of the invention the container will be filled, or partially filled, with a liquid, usually water. When the device is intended for heating fluid, such as is used in intravenous injections, the body 20 of the container is provided with a tube 72, leading through it for the passage of the liquid to be heated. This tube may be coiled, as indicated, and to such extent or of such capacity as may be necessary to retain the flowing liquid under the influence of the heater for a sufficient length of time to secure a desired temperature.

I claim as my invention—

1. In a heater, in combination, a container, a separable chambered closure therefor, main line connectors carried by the closure, a local electric circuit housed within the closure, a cut-out switch in the local circuit normally open when the closure is disconnected from the container the movable element of the switch being so positioned that it is moved to close the circuit by the application of the closure to the container.

2. In a heater, in combination, a container, a separable chambered closure therefor, main line connectors carried by the closure, a local electric circuit housed within the closure, a cut-out switch in the local circuit comprising a pair of contact elements one thereof being normally retracted and positioned to be automatically advanced as the closure is applied to the container.

3. In a heater, in combination, a container, a chambered cover therefor, a local electric circuit housed within the cover, a conductor supported from the chamber floor, a connector for a leading-in line mounted with but insulated from the conductor, a switch element depending from the connector, a spring switch element mounted and electrically connected with the conductor and normally spaced from the first-named switch, a vertically movable pin carried by and projecting downwardly from the cover and positioned for engagement with the container when the cover is applied thereto and to urge the last-named switch element upwardly to close the circuit.

4. In a heater, in combination, a container, a chambered cover therefor, a local electric circuit within the chamber, an electric heater and a thermo regulator depending into the container from the cover, the heater being incorporated in the circuit, a normally open cut-out switch in the circuit automatically closed by the application of the cover to the container, a manually controlled cut-out switch, and a third cut-out switch controlled by the regulator.

5. In a heater, in combination, a container, a chambered cover therefor, a local electric circuit within the chamber, an electric heater and a thermo regulator depending into the container from the cover, the heater being incorporated in the circuit, three independent cut-out switches in the circuit, one thereof being closed by the application of the cover to the container, one being manually controlled, and the third being controlled by the regulator.

6. In a heater, in combination, a container, a chambered cover therefor, a local electric circuit within the chamber, an electric heater and a thermo regulator depending into the container from the cover, the heater being incorporated in the circuit, three independent cut-out switches in the circuit, one thereof being closed by the application of the cover to the container, one being manually controlled, and the third being spring-closed and openable by the regulator, and manually controlled means for varying the action of the regulator on the switch by varying the action of the spring, whereby different temperatures within the container may be maintained.

7. In a heater, in combination, a container, a chambered cover therefor, a local circuit within the chamber, a heater depending from the cover and included in the circuit, a spring-closed cut-out switch in the circuit, a thermo regulator depending from the cover and adapted to open the switch in opposition to the spring pressure, and means for varying the range of action of the spring for varying its closing pressure upon the switch.

8. In a heater, in combination, a container, a chambered cover therefor, a local circuit within the chamber, a heater depending from the cover and included in the circuit, a spring-closed cut-out switch in the circuit, a thermo regulator depending from the cover and adapted to open the switch in opposition to the spring pressure, and means for varying the effective closing pressure of the spring upon the switch.

9. In a heater, in combination, a container, a chambered cover therefor, a local circuit within the chamber, a heating element depending from the cover and included in the circuit, a spring-closed cut-out switch in the circuit, a thermo regulator depending from the cover and adapted to open the switch in opposition to the spring pressure, and means for varying the effective closing pressure of the spring upon the switch, such means comprising an eccentrically pivoted plate for opposing the tension of the spring.

10. In a heater, in combination, a container, a chambered cover therefor, a local circuit within the chamber, a heating element depending from the cover and included in the circuit, a thermo regulator depending from the cover comprising a bi-metallic helix and independently movable terminal elements therefor, a cut-out switch in the circuit connected with one of such terminal elements normally closed by the contraction of the helix, and an eccentric oscillatable plate for governing the turning of the other element.

11. In a heater, in combination, a container, a chambered cover therefor, a local circuit within the chamber, a heating element depending from the cover and included in the circuit, a thermo regulator depending from the cover comprising a bi-metallic helix and independently movable terminal elements therefor, a cut-out switch in the circuit connected with one of such terminal elements normally closed by the contraction of the helix, a spring for moving the other terminal in one direction, and an oscillatable eccentric for moving such terminal in opposition to the spring.

12. In combination, an electric circuit including a heating element, a thermo-regulator for the circuit and located in the zone heated by the element and comprising a bi-metallic helix, rotatable terminals therefor, a cut-out switch in the circuit one element thereof being mounted on one of the helix terminals, a cam for turning the other terminal to tension the helix, and means for turning the last-named terminal to relax the helix.

13. In combination, an electric circuit including a heating element, a thermo-regulator for the circuit and located in the zone heated by the element and comprising a bi-metallic helix, rotatable terminals therefor, a cut-out switch in the circuit one element thereof being mounted on one of the helix terminals, a cam for turning the other terminal to tension the helix, means for turning the last-named terminal to relax the helix, and a temperature scale associated with the cam.

14. In combination, an electric circuit including a heating element, a thermo-regulator for the circuit located in the zone heated by the element and having rotatable terminals, a cut-out switch in the circuit, one element thereof being mounted on one of the thermo-regulator terminals, means for turning the other terminal to fix the value at which the cut-out switch operates, and a temperature scale associated with said means.

15. In a device of the class described, a container, a cover therefor, a heating element and a thermo-regulator on the cover projecting into the container, an electrical circuit on the cover including a cut-out switch associated with the thermo-regulator, means for adjusting the thermo-regulator to cause the cut-out switch to open and close the circuit through the heating element at predetermined temperature conditions within the container, and a temperature scale associated with said means, said cover with its appendages being removable as a whole from the container.

16. In a heater, in combination, a container, a chambered cover therefor, a local electric circuit within the chamber, an electric heater and a thermo-regulator depending into the container from the cover, the heater being incorporated in the local circuit, a normally open cut-out switch in the circuit automatically closed by the application of the cover to the container, and a cut-out switch controlled by the regulator.

CARL S. HORNBERGER.